United States Patent [19]
Eschbach

[11] Patent Number: 5,321,522
[45] Date of Patent: Jun. 14, 1994

[54] ADCT COMPRESSION WITH MINIMUM COMPRESSION RATIO

[75] Inventor: Reiner Eschbach, Webster, N.Y.

[73] Assignee: Xerox Corporation, Stamford, Conn.

[21] Appl. No.: 93,574

[22] Filed: Jul. 19, 1993

[51] Int. Cl.$^5$ .............................. H04N 1/415
[52] U.S. Cl. .................... 358/433; 358/444; 358/426; 358/445; 348/384
[58] Field of Search ............. 358/433, 444, 426, 445, 358/432, 136, 133, 261.1, 261.2, 261.3, 262.1

[56] References Cited

U.S. PATENT DOCUMENTS

| | | | |
|---|---|---|---|
| 4,999,705 | 3/1991 | Puri | 358/136 |
| 5,001,559 | 3/1991 | Gonzales et al. | 358/133 |
| 5,049,991 | 9/1991 | Niihara | 358/136 |
| 5,051,840 | 9/1991 | Watanabe et al. | 358/433 |
| 5,220,440 | 6/1993 | Hisatake | 358/433 |

OTHER PUBLICATIONS

W. H. Chen & C. H. Smith, "Adaptive Coding of Monochrome and Color Images", IEEE Trans. Comm., vol. Com-25, No. 11, Nov. 1977, pp. 1285-1292.

P. G. Roetling, "Visual Performance and Image Coding", Proceedings of the S.I.D., 17/2, pp. 111-114 (1976).

*Primary Examiner*—Edward L. Coles, Sr
*Assistant Examiner*—Fan Lee
*Attorney, Agent, or Firm*—Mark Costello

[57] ABSTRACT

A method of compressing an original document image in a manner assuring a minimum compression ratio includes the steps: a) storing to a tile memory a portion of the document image; b) from the document image portion stored in tile memory, using the discrete cosine transform a basis function (DCT), forming a frequency space representation of the image at a transformer; c) retrieving a set of stored values referred to as a Q-Table, d) dividing each of the Q-Table values into the DCT value, and returning the integer portion of the value as the quantized DCT value; e) encoding the quantized DCT values using a statistical encoding method; f) determining whether the data block size is larger than desired, and if not, passing the data block to an output; g) otherwise, reducing a least one high frequency component of the frequency space representation of the document image and and repeating steps e)-g) until the size of the data block is acceptable. In accordance with another aspect of the invention, the steps of f and g may be expressed as: f) counting the number of bits representing the compressed tile of image data; g) comparing the count to a reference; h) if the count is less than the reference, passing the compressed tile to an output; i) if the count is greater than the reference, modifying the quantized DCT values, and repeating steps e)-i).

18 Claims, 6 Drawing Sheets

IMAGE BLOCK

| 217 | 217 | 216 | 216 | 217 | 216 | 217 | 214 |
|---|---|---|---|---|---|---|---|
| 219 | 220 | 218 | 218 | 217 | 217 | 218 | 215 |
| 217 | 217 | 215 | 213 | 214 | 214 | 216 | 216 |
| 214 | 213 | 211 | 210 | 210 | 212 | 215 | 218 |
| 215 | 124 | 52 | 51 | 109 | 146 | 217 | 220 |
| 123 | 55 | 53 | 49 | 48 | 48 | 208 | 131 |
| 58 | 56 | 195 | 195 | 111 | 43 | 186 | 98 |
| 62 | 61 | 204 | 204 | 118 | 39 | 176 | 48 |

FIG. 2B

DCT

| 301 | -52 | 35 | -39 | -4 | 106 | -46 | 61 |
|---|---|---|---|---|---|---|---|
| 378 | 31 | 35 | 77 | 9 | -119 | 43 | -65 |
| -15 | 50 | -154 | -92 | -18 | 53 | -9 | 23 |
| -138 | -60 | 124 | 51 | 10 | 3 | -13 | 6 |
| 45 | 8 | 8 | 26 | 6 | -19 | 9 | -8 |
| 60 | 19 | -78 | -56 | -6 | 7 | 6 | 0 |
| -54 | -3 | 31 | 21 | -6 | 6 | -11 | 4 |
| -1 | -15 | 22 | 11 | 11 | -8 | 7 | -1 |

FIG. 2C

Q-TABLE

| 16 | 11 | 10 | 16 | 24 | 40 | 51 | 61 |
|---|---|---|---|---|---|---|---|
| 12 | 12 | 14 | 19 | 26 | 58 | 60 | 55 |
| 14 | 13 | 16 | 24 | 40 | 57 | 69 | 56 |
| 14 | 17 | 22 | 29 | 51 | 87 | 80 | 62 |
| 18 | 22 | 37 | 56 | 68 | 109 | 103 | 77 |
| 24 | 35 | 55 | 64 | 81 | 104 | 113 | 92 |
| 49 | 64 | 78 | 87 | 103 | 121 | 120 | 101 |
| 72 | 92 | 95 | 98 | 112 | 100 | 103 | 99 |

FIG. 2D

QDCT

| 19  | -5 | 4   | -2 | 0 | 3  | -1 | 1  |
|-----|----|-----|----|---|----|----|----|
| 32  | 3  | 3   | 4  | 0 | -2 | 1  | -1 |
| -1  | 4  | -10 | -4 | 0 | 1  | 0  | 0  |
| -10 | -4 | 6   | 2  | 0 | 0  | 0  | 0  |
| 3   | 0  | 0   | 0  | 0 | 0  | 0  | 0  |
| 3   | 1  | -1  | -1 | 0 | 0  | 0  | 0  |
| -1  | 0  | 0   | 0  | 0 | 0  | 0  | 0  |
| 0   | 0  | 0   | 0  | 0 | 0  | 0  | 0  |

FIG. 2E

ZIGZAG OF QDCT

| 19 | -5  | 32 | -1 | 3   | 4  | -2 | 3 |
|----|-----|----|----|-----|----|----|---|
| 4  | -10 | 3  | -4 | -10 | 4  | 0  | 3 |
| 0  | -4  | 6  | 0  | 3   | -1 | 1  | 0 |
| 2  | 0   | -2 | -1 | 1   | 1  | 1  | 0 |
| 0  | -1  | 0  | 0  | 0   | 0  | -1 | 0 |
| 0  | 0   | -1 | 0  | 0   | 0  | 0  | 0 |
| 0  | 0   | 0  | 0  | 0   | 0  | 0  | 0 |
| 0  | 0   | 0  | 0  | 0   | 0  | 0  | 0 |

ZIGZAG OF QDCT

| 19 | -5  | 32 | -1 | 3   | 4  | -2 | 3 |
|----|-----|----|----|-----|----|----|---|
| 4  | -10 | 3  | -4 | -10 | 4  | 0  | 3 |
| 0  | -4  | 6  | 0  | 3   | -1 | 1  | 0 |
| 2  | 0   | -2 | -1 | 1   | 1  | 1  | 0 |
| 0  | -1  | 0  | 0  | 0   | 0  | -1 | 0 |
| 0  | 0   | 0  | 0  | 0   | 0  | 0  | 0 |
| 0  | 0   | 0  | 0  | 0   | 0  | 0  | 0 |
| 0  | 0   | 0  | 0  | 0   | 0  | 0  | 0 |

ADCT COMPRESSION WITH MINIMUM COMPRESSION RATIO

The present invention is directed to a method of compressing images in accordance with the currently proposed JPEG ADCT (adaptive discrete cosine transform) standard, and more particularly, a method of assuring an adequate ratio of compression of those images by a slight modification of the compression step.

CROSS REFERENCE

Co-pending U.S. patent application Ser. No. 07/956,128 entitled "Decompression of Standard ADCT-Compressed Images" by R. Eschbach, filed Oct. 2, 1992 and assigned to the same assignee as the present invention is cross-referenced and incorporated by reference.

BACKGROUND OF THE INVENTION

Data compression is required in data handling processes, where too much data is present for practical applications using the data. Commonly, compression is used in communication links, where the time to transmit is long, or where bandwidth is limited. Another use for compression is in data storage, where the amount of media space on which the data is stored can be substantially reduced with compression. Yet another application is a digital copier or a multi-function device (MFD) where an intermediate storage for collation, reprint or any other digital copier/MFD functions is desired. Generally speaking, scanned images, i.e., electronic representations of hard copy documents, are commonly large, and thus are desirable candidates for compression.

Many different compression techniques exist, and many are proprietary to individual users. However, standards are desirable whenever intercommunication between devices will be practiced. Particularly with the advent of proliferating network communication, where formerly dissimilar devices are required to communicate, a common standard will be required. An example is the current desirability of FAX machines to be able to communicate with printers. Currently, compression standards are generally distinct for different devices.

Three major schemes for image compression are currently being studied by international standardization groups. A first, for facsimile type image transmission, which is primarily binary, is under study by the JBIG (Joint Binary Image Group) committee, a second for TV and film, a standard is worked on by the MPEG (Motion Pictures Expert Group). For non-moving general images, i.e., still images which are more general than the ones covered by JBIG, the group JPEG (Joint Photographic Expert Group) is seeking to develop a device independent compression standard, using an adaptive discrete cosine transform scheme.

ADCT (Adaptive Discrete Cosine Transform, described for example, by W. H. Chen and C. H. Smith, in "Adaptive Coding of Monochrome and Color Images", IEEE Trans. Comm., Vol. COM-25, pp. 1285-1292, November 1977), as the method disseminated by the JPEG committee will be called in this application, is a lossy system which reduces data redundancies based on pixel to pixel correlations. Generally, in images, on a pixel to pixel basis, an image does not change very much. An image therefore has what is known as "natural spatial correlation". In natural scenes, correlation is generalized, but not exact. For example, noise makes each pixel somewhat different from its neighbors.

ADCT transforms are well known, and hardware exists to perform the transform on image data, e.g., U.S. Pat. No. 5,049,991 to Nihara, U.S. Pat. No. 5,001,559 to Gonzales et al., and U.S. Pat. No. 4,999,705 to Puri. The primary thrust of these particular patents, however, is moving picture images, and not document images.

Figure 1:
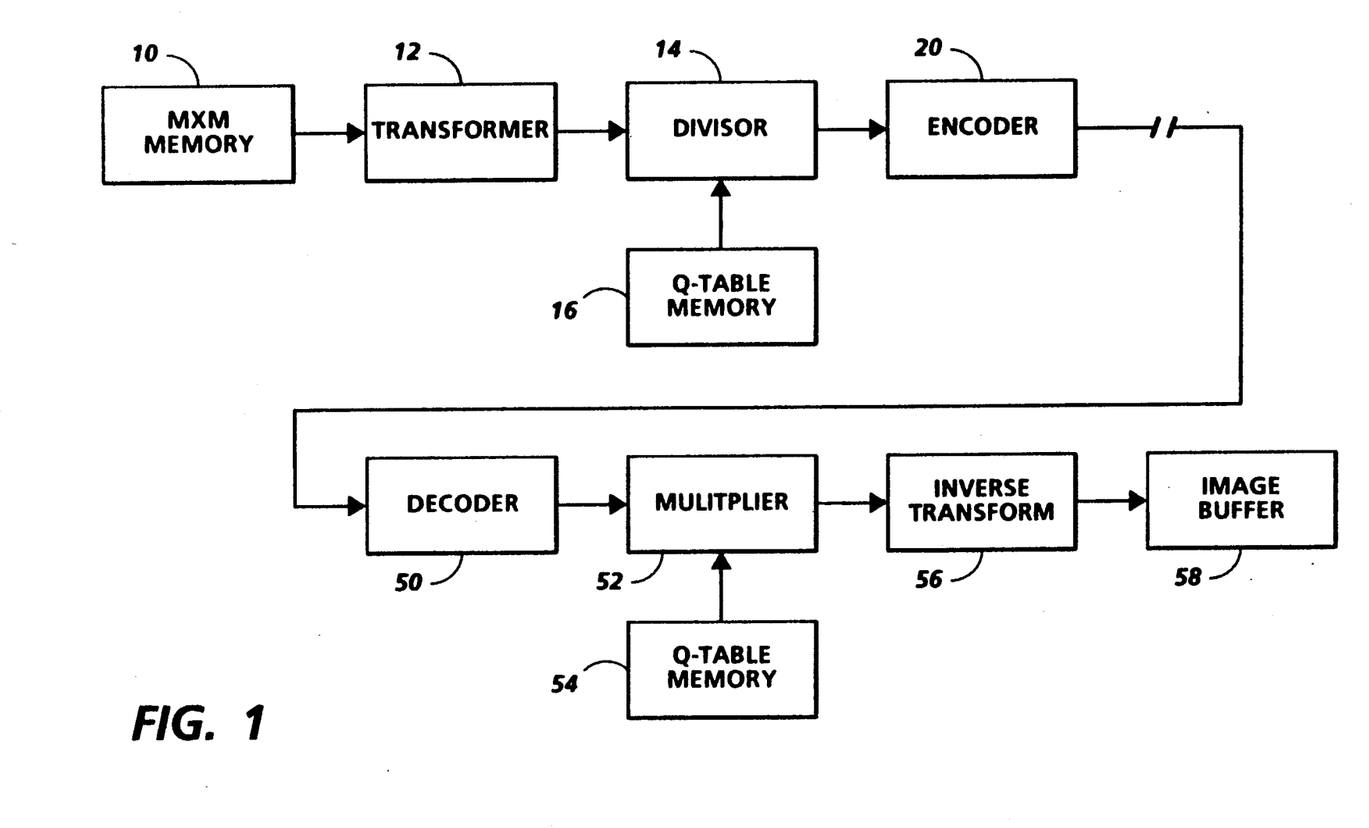
FIG. 1 shows a functional block diagram for the prior art ADCT compression/recompression process.

Generally, as shown in FIG. 1, the process of compression requires a tile memory 10 storing an $M \times M$ tile of the image. Square tiles are used in the description based on the JPEG recommendations, but it may be noted that the inventive method can be performed with any form of tiling. From the portion of the image stored in tile memory, a frequency space representation of the image is formed at transformer 12 using the discrete cosine transform (DCT). In the following we will refer to the DCT data as frequency space data. Hardware implementations are available, such as the C-Cube Microsystems CL550A JPEG image compression processor, which operates in either the compression or the decompression mode according to the proposed JPEG standard. A divisor/quantization device 14 is used, from a set of values referred to as a Q-Table, stored in a Q table memory 16, so that a distinct Q table value is divided into the DCT value, returning the integer portion of the value as the quantized DCT value. A statistical encoder 20 further compresses the quantized DCT values to generate the compressed image that is output for storage, transmission, etc.

The current ADCT compression method divides an image into $M \times M$ pixel blocks, where $M=8$. The selection of $M=8$ is a compromise, where the larger the block given, the higher the compression ratio obtainable. However, such a larger block is also more likely to have non-correlated pixels within the block, thereby reducing the compression ratio. If the block was smaller, greater correlation within the block might be achieved, but less overall compression would be achieved. Particularly within a document image, edges of the image are more likely to be encountered within an $8 \times 8$ block, than would be the case for a scene forming a natural image.

Compression schemes tend to use a set of basis functions to utilize the intra block correlations. Basis functions define the data as a projection onto a set of orthogonal functions on an interval. ADCT uses cosine functions as the basis functions and the Discrete Cosine Transform (DCT) as the projection step. In the first step of the ADCT standard, the image is tiled into $8 \times 8$ blocks. Within each block, a set of 64 DCT coefficients is determined for the pixels in the block. The DCT coefficients represent the coefficients of each cosine term of the discrete cosine transform of the $8 \times 8$ block.

Figure 2A:
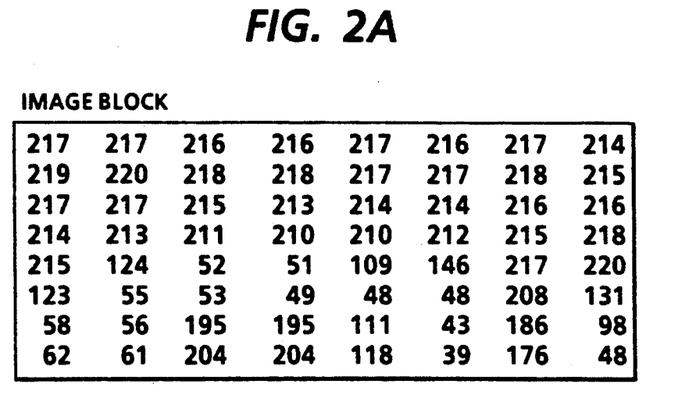
FIG. 2A shows an 8×8 block of image data to be compressed.

Referring now to FIG. 2A, an array of 64 gray level values representing 64 pixels in an $8 \times 8$ block of the image is shown. This $8 \times 8$ block is transformed according to the JPEG ADCT specifications giving the DCT coefficients shown in FIG. 2B. These coefficients still completely describe the image data of FIG. 2A, but in general larger values will now cluster at the top left corner in the low spatial frequency region. Simultaneously, in the vast majority of images as the frequency of the image increases, the coefficient values in the lower right hand portion of the grid tend towards lower values and zero.

Generally, the human eye tends to see low frequencies in an image better than high frequencies. At higher frequencies, changes from amplitude to amplitude are unnoticeable, unless such changes occur at extremely high contrast. This is a well known effect of the Human Visual System and extensively documented, see e.g. "Visual Performance and Image Coding" by P. Roetling, *Proceedings of the S.I.D.* 17/2 pp. 111–114 (1976). The ADCT method makes use of the fact that small amplitude changes at high frequencies can be generally ignored.

Figure 2B:
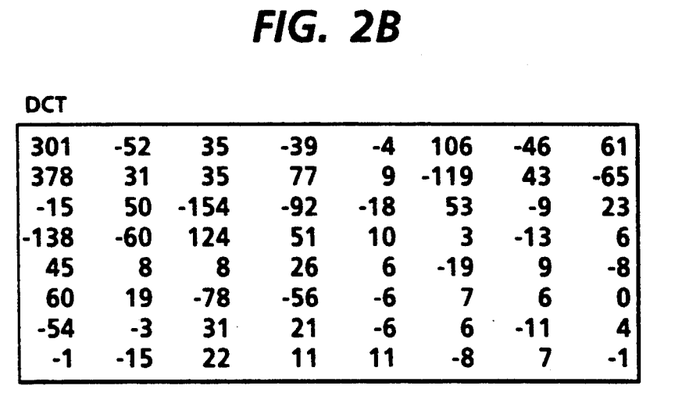
FIG. 2B shows the discrete cosine values as determined, giving a frequency space representation of the image of FIG. 2A.
Figure 2C:
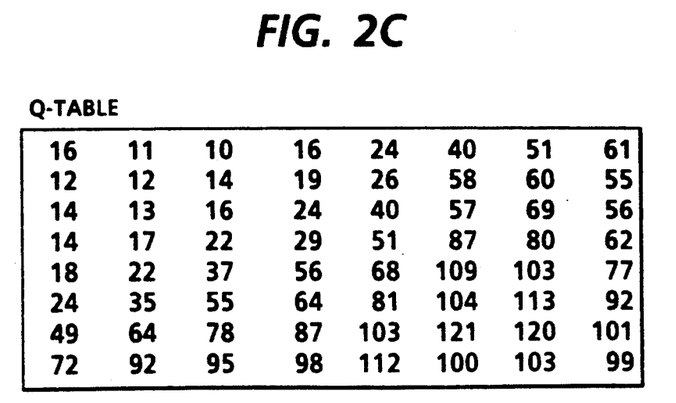
FIG. 2C shows the default Q-Table used in the examples.

The next step in the ADCT method involves the use of a quantization or Q-matrix. The Q-matrix shown in FIG. 2C is a standard JPEG-suggested matrix for compression, but ADCT as well as the proposed inventive method can also operate using other Q-matrices (or Q-Tables). The matrix incorporates the effect that lower frequencies are roughly more important than high frequencies by introducing generally larger quantization steps, i.e. larger entries, for larger frequencies. However, the table also attempts to internally construct some desirable variations from the general assumption. Accordingly, the values in the table do vary with frequency, where the exact variation might be a function of the human visual system, of the document type expected, i.e.: photo, text, graphic, etc., or of some other application dependent parameter. Each of the DCT values from FIG. 2B is divided by a corresponding Q-matrix value from FIG. 2C giving quantized DCT (QDCT) values by way of:

$$QDCT[m][n] = INT\{DCT[m][n] \div Q\text{-}Table[m][n] + \frac{1}{2}\}$$

where $INT\{A\}$ denotes the integer part of A

The remainder from the division process is discarded, resulting in a loss of data. Here and in the following we use the term division to describe the process detailed in ADCT including the methods for handling truncation and round-off. Furthermore, since the Q values in the lower right hand portion of the table tend to be high, most of the values in that area go to zero, unless there were extremely high amplitudes of the image at the higher frequencies.

Figure 2D:
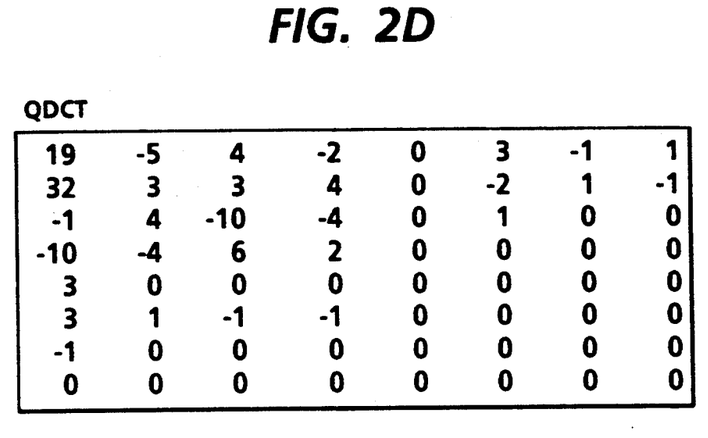
FIG. 2D shows the quantized discrete cosine values as determined.
Figure 2E:
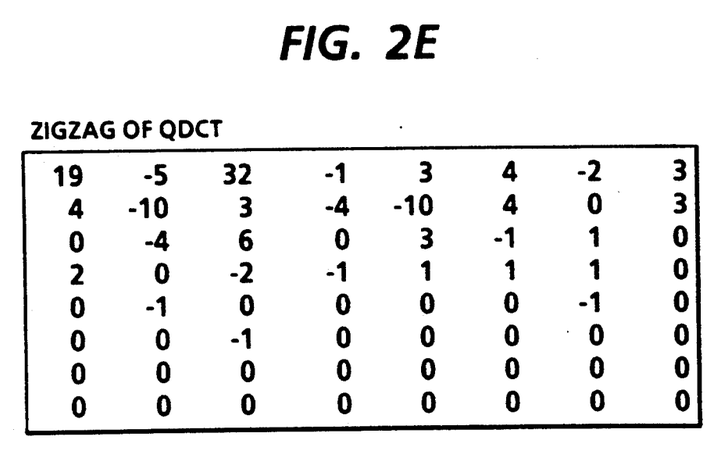
FIG. 2E shows the reordered QDCT values along with the total number of bits generated in the statistical encoding.

After deriving the quantized set of DCT values, shown in FIG. 2D, pixels are arranged in the order of a space filling zigzag curve shown in FIG. 2E and a statistical encoding method, such as the Huffman process, is used to generate the transmitted signal which in this example is described using 171 bits. This statistical coding is performed in a lossless way and the only loss introduced in the compression is the one generated by the quantization of the DCT coefficients using the Q-Table.

To decompress the now-compressed image, and with reference to FIG. 1, a series of functions or steps are followed to reverse the process described. The Huffman encoding is removed at decoder 50. The image signal now represents the quantized DCT coefficients, which are multiplied at signal multiplier 52 by the Q table values in memory 54 in a process inverse to the compression process. At inverse transformer 56, the inverse transform of the discrete cosine transform is derived, and the output image in the spatial domain is stored at image buffer 58.

The actual amount of compressed data, or the compression ratio can be seen to be a function of the image itself, and therefore cannot be predicted. Unfortunately, this leads to difficulties in designing systems that handle compressed image, in terms of selecting buffer size, bandwidth, etc.

All of the references cited herein above are incorporated by reference for their teachings.

SUMMARY OF THE INVENTION

In accordance with the invention, there is provided a method of assuring a minimum compression ratio of ADCT compressed images, in which the upper limit of the number of bits generated by the statistical encoding table is set, thereby setting a lower limit on the achieved compression ration.

In accordance with one aspect of the invention, a method of compressing an original document image includes the steps: a) storing to a tile memory a portion of the document image; b) from the document image portion stored in tile memory, using the discrete cosine transform (DCT), forming a frequency space representation of the image at a transformer; c) retrieving a set of stored values referred to as a Q-Table, d) dividing each of said Q-Table values into the DCT value, and returning the integer portion of the value as the quantized DCT value; e) encoding the quantized DCT values using a statistical encoding method; f) determining whether the data block size is larger than desired, and if not, passing the data block to an output; g) otherwise, adaptively reducing the high frequency components of the frequency space representation of the document image and repeating steps e)–g) until the size of the data block is acceptable.

In accordance with another aspect of the invention, the method, the steps of f and g may be expressed as: f) counting the number of bits representing the compressed tile of image data; g) comparing the count to a reference; h) if the count is less than the reference, passing the compressed tile to an output; i) if the count is greater than the reference, modifying the quantized DCT values, and repeating steps e)–i).

In accordance with yet another aspect of the invention, the steps may be expressed at: f) counting the bits for a number of blocks; g) comparing that total count to a reference; h) if the count is less than the reference, passing the compressed tile to an output; i) if the count is greater than the reference, modifying the quantized DCT values, and repeating steps e)–i).

While the described process is straightforward, the particular strategy for modifying quantized DCT values presents significant issues. However, since it is known that the ADCT compression method makes use of the fact that small amplitude changes at high frequencies can be generally ignored, it can also be surmised that small changes at high frequencies may be tolerated and provide only minimal image degradation upon decompression. Accordingly, the iterative process described above reviews each of the QDCT values, starting from the QDCT value at the highest spatial frequency, and proceeds through the QDCT values towards the QDCT values at the lowest spatial frequencies, reducing the first non-zero value encountered by a predetermined amount, and iteratively reviewing the resulting encoding until the desired compression ratio is obtained.

These and other aspects of the invention will become apparent from the following descriptions to illustrate a preferred embodiment of the invention read in conjunction with the accompanying drawings in which:

DETAILED DESCRIPTION OF THE INVENTION

Figure 3:
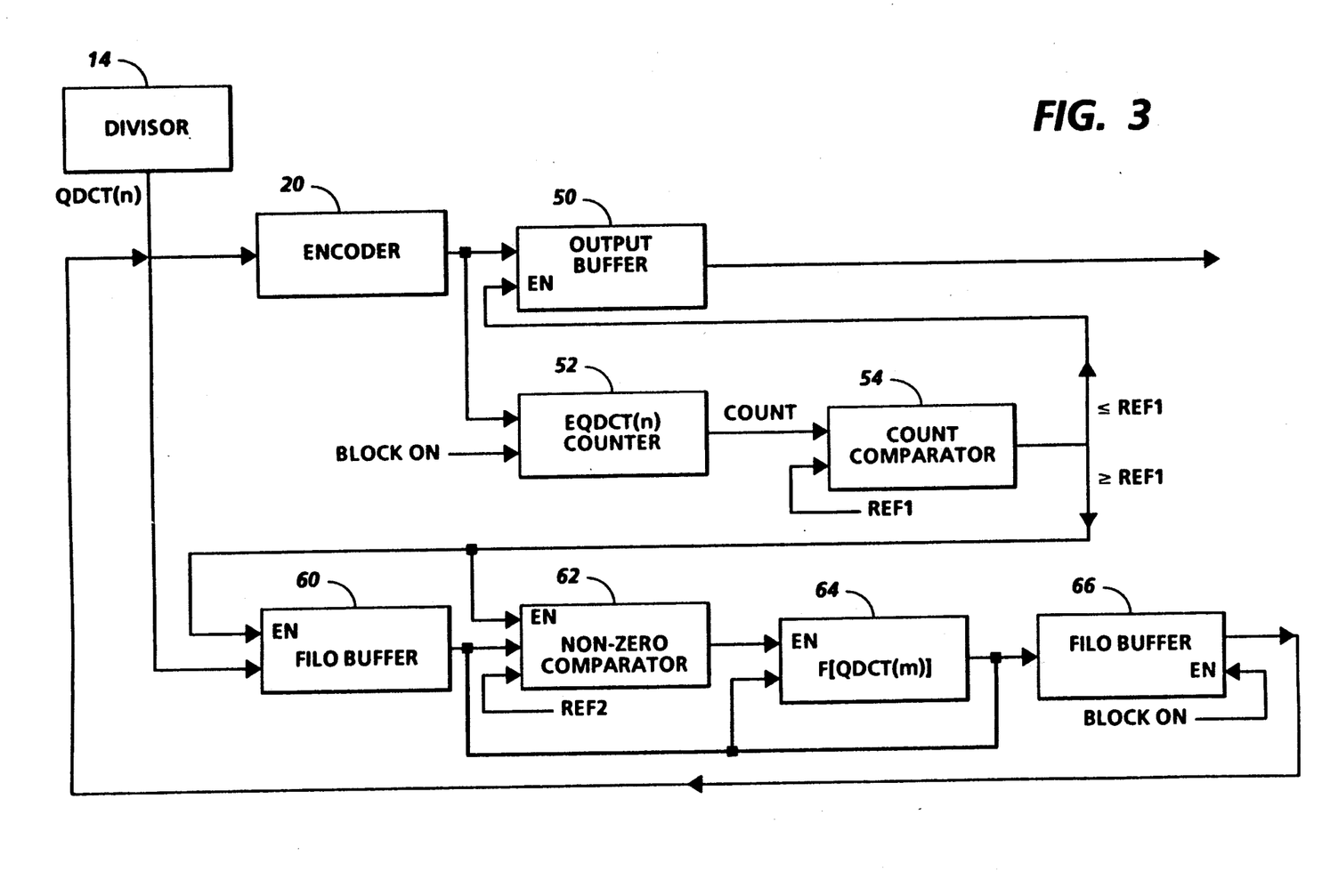
FIG. 3 shows a functional block diagram of a system incorporating the present invention.

With reference now to FIG. 3, where the showings are for the purpose of illustrating the present invention and not limiting same, the interoperation of the invention with the standards JPEG ADCT process is show.

At divisor 14, DCT coefficients now representing the image in frequency space are converted into quantized values (QDCT), where the remainders of the division process are discarded. The output of divisor 14 is directed to encoder 20, which encodes the data in accordance with a statistical encoding method such as Huffman. The encoded output EQDCT of encoder 20 is directed to output buffer 50, which temporarily holds the data for output to a transmission line until it receives an enable signal EN, as will be further explained.

The output of encoder 20 is also directed to EQDCT counter 52. During the period that EQDCT counter 52 receives a BLOCK ON signal, indicating the receipt of a block of encoded, quantized coefficient data, a counter is incremented for each bit of data received. When the BLOCK ON signal is off, the value COUNT which was derived is directed to a count comparator, which compares the value COUNT with a value REF1, a reference value represents the largest number of bits allowed in the block, a comparison that guarantees a minimum compression ratio. If the value is less than or equal to REF1, an EN signal is produced to instruct output buffer 50 to output the data for transmission. In an example, we elected to limit EQDCT to 170 bits.

Should count comparator 54 determine that COUNT is greater than REF1, the block of QDCT values represented by EQDCT is stored at a First In Last Out (FILO) buffer 60, upon receipt of the EN signal from the count comparator 54. The FILO buffer 60 effectively reorders the coefficients so that the first coefficients in order correspond to the highest frequency elements of the image block. Each coefficient is directed to a non-zero comparator 62, which compares the coefficient with a value REF2, to find the first non-zero value, where REF2 represents zero. Upon detection of a non-zero value, a reducing function F [QDCT(m)] 64, is enabled to reduce the non-zero QDCT(M) value, where positive QDCT values are reduced by subtracting and negative QDCT values are reduced by adding a specified quantity. If reducing function 64 is not enabled, the QDCT(m) values are stored without change to a second FILO buffer 66, which reorders the data to represent QDCT(n). If reducing function 64 is enabled, the QDCT(m) value are reduced at function 64 and stored to a second FILO buffer 66, which reorders the data to represent QDCT(n). Non-zero comparator 62 is enabled by a signal from count comparator 54 for the comparison operation, but upon determining a non-zero value, resets a flag so that no further non-zero determinations will enable reducing function 64.

Second FILO buffer 66 has stored a set of values representing the QDCT coefficients with previous non-zero highest frequency coefficient reduced. Upon receiving a determination that the entire block of values has been stored, FILO buffer 66 reorders the coefficients so that the first coefficients in order correspond to the lowest frequency elements of the image block. The output of FILO buffer 66 is directed to encoder 20, which encodes the data in accordance with a statistical encoding method. It will be clear that the process is iterative at this point, since until EQDCT has a number of bits smaller than REF1, the process will continue to run. Of course, an iteration counter could be provided to count the processing of each iteration, to assure a maximum number of iterations.

Figure 5:
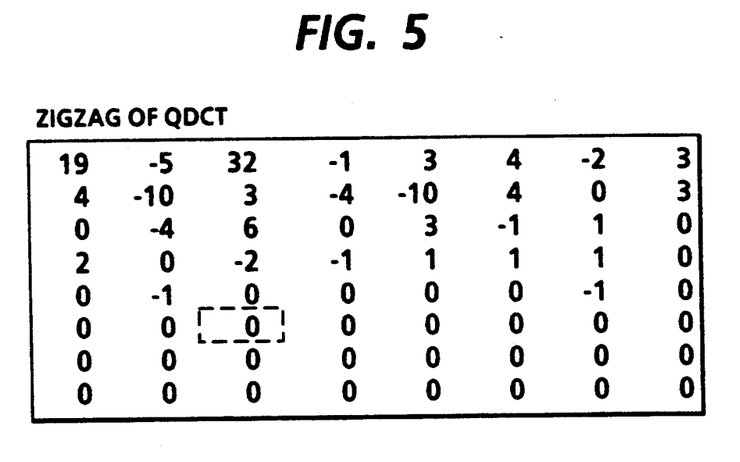
FIG. 5 shows the altered QDCT encoded value example data.

FIG. 5 shows the altered QDCT values, with the changed value marked with a dashed box. The result is that the altered QDCT values can be represented by 164 bits.

Figure 4:
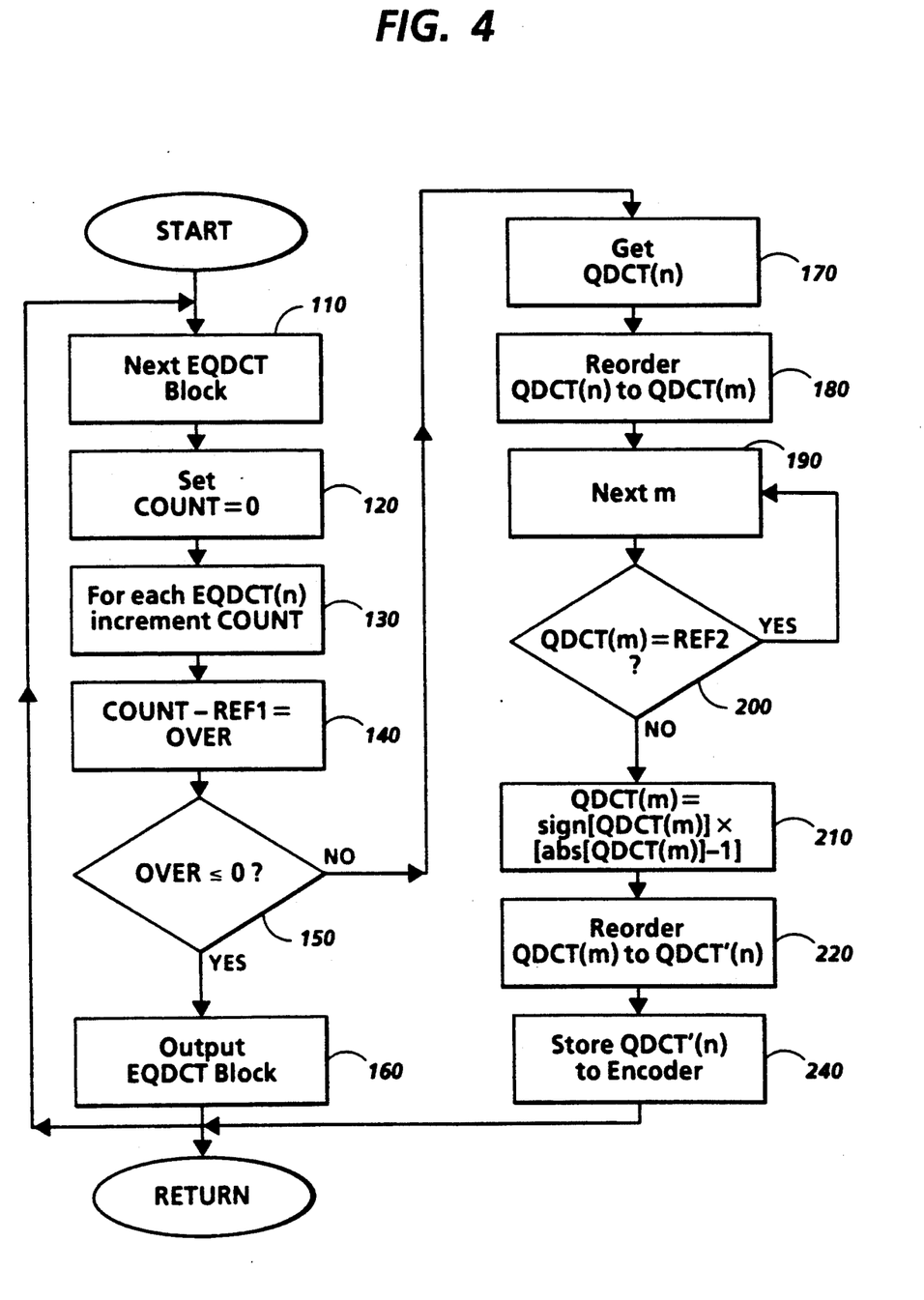
FIG. 4 shows a flow chart illustrating the process steps of the present invention.

Turning now to the flow chart shown in FIG. 4, the process will be described as a series of steps. At step 110, the next block of output (EQDCT) of encoder 20 is received. At step 120, COUNT is set to zero. At step 130, COUNT is incremented for each bit of EQDCT received. At step 140, value REF1 is subtracted from COUNT, to derive an overage value called OVER. At step 150, if OVER is less than or equal to 0, EQDCT is output at step 160 and the process continues for the next block of EQDCT.

However, at step 150, if OVER is greater than 0, then at step 170, the block of QDCT values (QDCT(n)) represented by EQDCT is retrieved, and at step 180 QDCT(n) is reordered as QDCT(m) so that the first coefficients in order correspond the the highest frequency elements of the image block. At steps 190 and 200, each value of QDCT(m) is compared in order with a value REF2, to find the first non-zero value, where REF2 typically represents zero. If QDCT(m) is equal to zero, then the next value in order is taken at steps 190 and 200. If non-zero value for QDCT(m) is detected, QDCT(m) is reduced at step 210, if QDCT>0—>sign[]=1, if QDCT<0—>sign=−1, abs —> absolute value=>so 5 is reduced to 4 and −5 is reduced to −4.

At step 220, QDCT(m) is reordered as QDCT'(n) so that the first coefficients in order correspond to the lowest frequency elements of the image block. At step 240, QDCT'(n) is stored back to the encoder 20. It will be clear that the process is iterative at this point, since until EQDCT has a number of bits smaller than REF1, the process will continue to run.

It should be noted in the above descriptions, that the reordering steps 180 and 220 as well as 60 and 66 were used to allow an incremental addressing for QDCT(m). Implementations are envisioned, in which the reordering is omitted and QDCT(m) is decrementally addressed.

It is also the intent of the present invention to allow for an implementation in which the total number of reduction operations on an individual QDCT(m) is limited as well as an implementation that limits the total number of reduction operations per block.

Another obvious extension to the described inventive method is to allow block-to-block variations of REF1 in response to average compression ratios obtained for a preselected group of previous blocks.

The magnitudes of the entries in the Q-table reflect the relative importance of the frequency component in the image. The resetting or reducing function may operate in a mode taking into account the design of the Q-table, and reset certain frequencies of the QDCT function which are considered unimportant. Thus, the resetting order may be other than highest frequency first.

While the present invention works well with standard ADCT decompression techniques, providing only minimal image degradation at portions of the image least noticeably to the eye, it has been found to work exceptionally well with the non standard ADCT decompression technique described in co-pending U.S. patent application Ser. No. 07/956,128 entitled "Decompression of Standard ADCT-Compressed Images" by R. Eschbach, filed Oct. 2, 1992, and assigned to the same assignee and incorporated by reference herein.

The invention has been described with reference to a particular embodiment. Modifications and alterations will occur to others upon reading and understanding this specification. It is intended that all such modifications and alterations are included insofar as they come within the scope of the appended claims or equivalents thereof.

I claim:

1. A method of compressing a document image in a manner assuring a minimum compression ratio thereof, wherein the document image is expressed in terms of pixels, each pixel representing a discrete area of the document image having a digital value representing reflectance varying between a minimum and maximum value, the method including the steps of:
   a) storing to a tile memory a block of pixels of the document image;
   b) retrieving to a transformer, the block of pixels stored in tile memory, said transformer forming a frequency space representation of the block of pixels including a set of frequency coefficients representing amplitudes of the document image at increasing frequencies of the document image;
   c) retrieving from a memory a set of stored values referred to as a Q-Table to a dividing circuit;
   d) at the dividing circuit, operatively connected to the transformer and receiving the set of frequency coefficients therefrom, dividing each of said Q-Table values into a corresponding frequency coefficient, and returning an integer portion of a result as a quantized frequency coefficient;
   e) at an encoder, receiving the quantized frequency coefficient from the dividing circuit and using a statistical encoding method, providing an encoded set of frequency coefficients;
   f) determining whether an encoded set of frequency coefficients has a size in terms of storage space required larger than desired, and if not, passing the set of frequency coefficients to an output;
   g) if the encoded set of frequency coefficients has a size in terms of required storage space larger than desired, selectively reducing a selected frequency component of the frequency space representation of the document image block; and
   h) iteratively repeating steps e)–g).

2. The method as defined in claim 1, wherein the block of pixels of the document image represents an M pixel by M pixel area of the image.

3. The method as defined in claim 1, wherein the frequency space representation utilizes a discrete cosine transform as a basis function.

4. The method as defined in claim 1, wherein the statistical encoding method used is the Huffman encoding method.

5. The method as defined in claim 1, wherein the desired size in terms of storage space of the encoded set of frequency coefficients is determined by reference to an external buffer size.

6. The method as defined in claim 1, wherein the desired size in terms of storage space of the encoded set of frequency coefficients is given in terms of bits of information.

7. The method described in claim 1, wherein the document image digital reflectance value represents a component value of a predefined color space.

8. The method described in claim 1, wherein the selective reduction operation of one high frequency component is replaced by resetting said component to zero.

9. The method described in claim 1, wherein the determination whether an encoded set of frequency coefficients has a size in terms of storage space required larger than desired is made using size requirements dependent on an average compression rate of a plurality of compressed pixel blocks.

10. A method of compressing a document image in a manner assuring a minimum compression ratio thereof, wherein the document image is expressed in terms of pixels, each pixel representing a discrete area of the document image having a digital value representing reflectance varying between a minimum and maximum value, the method including the steps of:
   a) storing to a tile memory a block of pixels of the document image;
   b) retrieving to a transformer, the block of pixels stored in tile memory, said transformer forming a frequency space representation of the block of pixels including a set of frequency coefficients representing amplitudes of the document image at increasing frequencies of the document image;
   c) retrieving from a memory a set of stored values referred to as a Q-Table to a dividing circuit;
   d) at the dividing circuit, operatively connected to the transformer and receiving the set of frequency coefficients therefrom, dividing each of said Q-Table values into a corresponding frequency coefficient, and returning an integer portion of a result as a quantized frequency coefficient;
   e) at an encoder, receiving the quantized frequency coefficient from the dividing circuit and using a statistical encoding method, providing an encoded set of frequency coefficients;
   f) determining from device requirements a maximum size of the encoded set of frequency coefficients in terms of a maximum number of bits of memory;
   g) at a counter, receiving the encoded set of frequency coefficients and counting the number of bits representing that block of pixels;
   h) if the number of counted bits is less than the maximum number of bits of memory, directing the encoded set of frequency coefficients to an output;
   i) if the number of bits exceeds the maximum number of bits of memory, reducing at least one high frequency component of the frequency space representation of the document image; and j) iteratively repeating steps e)–i) until the set of frequency coefficients is passed to an output.

11. The method as defined in claim 10, wherein the block of pixels of the document image represents an M pixel by M pixel area of the image.

12. The method as defined in claim 10, wherein the frequency space representation utilizes a discrete cosine transform as a basis function.

13. The method as defined in claim 10, wherein the statistical encoding method used is the Huffman encoding method.

14. The method as defined in claim 10, wherein the desired size in terms of storage space of the encoded set of frequency coefficients is determined by reference to an external buffer size.

15. The method as defined in claim 10, wherein the desired size in terms of storage space of the encoded set of frequency coefficients is given in terms of bits of information.

16. The method described in claim 10, wherein the document image digital reflectance value represents a component value of a predefined color space.

17. The method described in claim 10, wherein the selective reduction operation of one high frequency component is replaced by resetting said component to zero.

18. The method described in claim 10, wherein the determination whether an encoded set of frequency coefficients has a size in terms of bits of memory required larger than desired is made using size requirements dependent on an average compression rate of a plurality of compressed pixel blocks.

* * * * *